(12) United States Patent
Hara

(10) Patent No.: US 11,616,452 B2
(45) Date of Patent: Mar. 28, 2023

(54) SWITCHING DEVICE, SWITCHING POWER SUPPLY APPARATUS, AND VEHICLE

(71) Applicant: Panasonic Intellectual Property Management Co., Ltd., Osaka (JP)

(72) Inventor: Shoichi Hara, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 17/192,641

(22) Filed: Mar. 4, 2021

(65) Prior Publication Data
US 2021/0288589 A1    Sep. 16, 2021

(30) Foreign Application Priority Data

Mar. 11, 2020  (JP) .............................. JP2020-042054

(51) Int. Cl.
| | |
|---|---|
| *H02M 1/32* | (2007.01) |
| *H02M 7/06* | (2006.01) |
| *H02M 7/155* | (2006.01) |
| *H02M 1/10* | (2006.01) |
| *B60L 53/22* | (2019.01) |
| *H02M 7/537* | (2006.01) |
| *H02M 1/12* | (2006.01) |
| *H02M 1/44* | (2007.01) |

(52) U.S. Cl.
CPC .............. *H02M 7/062* (2013.01); *H02M 1/10* (2013.01); *H02M 1/32* (2013.01); *H02M 7/1557* (2013.01); *B60L 53/22* (2019.02); *H02M 1/126* (2013.01); *H02M 1/44* (2013.01); *H02M 7/537* (2013.01)

(58) Field of Classification Search
CPC .......... H02M 1/10; H02M 1/126; H02M 1/44; H02M 1/32; H02M 7/062; H02M 7/1557; H02M 7/537; B60L 53/22; B60L 2210/10; Y02T 10/70; Y02T 10/7072; Y02T 10/72; Y02T 90/14
See application file for complete search history.

(56) References Cited

U.S. PATENT DOCUMENTS

| | | | | |
|---|---|---|---|---|
| 2010/0080022 | A1* | 4/2010 | Schmidt ................ | H02M 7/062 363/53 |
| 2012/0212986 | A1* | 8/2012 | Minami .............. | H02M 1/4233 363/126 |
| 2015/0042166 | A1* | 2/2015 | Fujita .................... | H02M 7/483 307/63 |

(Continued)

FOREIGN PATENT DOCUMENTS

JP   2017-169350 A   9/2017

*Primary Examiner* — Thienvu V Tran
*Assistant Examiner* — Shahzeb K Ahmad
(74) *Attorney, Agent, or Firm* — Seed IP Law Group LLP

(57) ABSTRACT

A switching device is provided. The apparatus includes a switching circuit and a noise filter. The switching circuit is capable of switching a connection destination of a first power conversion circuit other than a second power conversion circuit among the plurality of power conversion circuits between a phase corresponding to the first power conversion circuit and a certain phase of the external power supply. The second power conversion circuit corresponds to the certain phase of the external power supply. In the noise filter, a capacitor is provided on a side of the multiple-phase AC supply of the switching circuit.

17 Claims, 8 Drawing Sheets

(56) References Cited

U.S. PATENT DOCUMENTS

2017/0201092 A1\* 7/2017 Minato ................... H02M 1/12
2019/0036462 A1\* 1/2019 Tazaki ................... H02M 7/06
2021/0143727 A1\* 5/2021 Yamakawa ............. H02M 7/06

\* cited by examiner

SWITCHING DEVICE, SWITCHING POWER SUPPLY APPARATUS, AND VEHICLE

TECHNICAL FIELD

The present disclosure relates to a switching device, a switching power supply apparatus, and a vehicle.

BACKGROUND ART

Patent Literature 1 discloses a switching power supply apparatus with a plurality of power conversion circuits that convert an alternating current (AC) voltage supplied from an AC power supply into a direct current (DC) voltage. The switching power supply apparatus includes a switching circuit that switches between a phase of the AC power supply corresponding to each of the plurality of power conversion circuits and a phase common to the plurality of power conversion circuits, and noise filters provided at the phases respectively corresponding to the plurality of power conversion circuits. Each of the noise filters includes a capacitor and a coil for preventing noise from entering from the AC power supply to the power conversion circuit and flowing out of the power conversion circuit into the AC power supply. The capacitor and the coil are provided on the power conversion circuit side of the switching circuit.

CITATION LIST

Patent Literature

PTL 1
Japanese Patent Application Laid-Open No. 2017-169350

SUMMARY OF INVENTION

Solution to Problem

A switching device according to an embodiment of the present disclosure is a switching device provided with a plurality of power conversion circuits respectively corresponding to phases of a multiple-phase power supply as an external power supply. The switching device includes a switching circuit and a noise filter. The switching circuit is capable of switching a connection destination of a first power conversion circuit other than a second power conversion circuit among the plurality of power conversion circuits between a phase corresponding to the first power conversion circuit and a certain phase of the external power supply. The second power conversion circuit corresponds to the certain phase of the external power supply. The noise filter includes a capacitor and a coil for removing noise. The capacitor is provided on a side of the multiple-phase power supply of the switching circuit.

A switching power supply apparatus according to an embodiment of the present disclosure includes the switching device described above and the plurality of power conversion circuits.

A vehicle according to an embodiment of the present disclosure includes the switching power supply apparatus described above.

Advantageous Effects of Invention

According to an embodiment of the present disclosure, it is possible to build a switching device that prevents the occurrence of an overcurrent flowing through a switching circuit, and also possible to provide a switching power supply apparatus including the switching device, and a vehicle including the switching power supply apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, a preferred embodiment of the present disclosure will be described in detail with reference to the accompanying drawings. Note that components having substantially the same functions are denoted by the same reference signs in the present specification and drawings, and the repetitive descriptions thereof are omitted.

Embodiment

Figure 1:
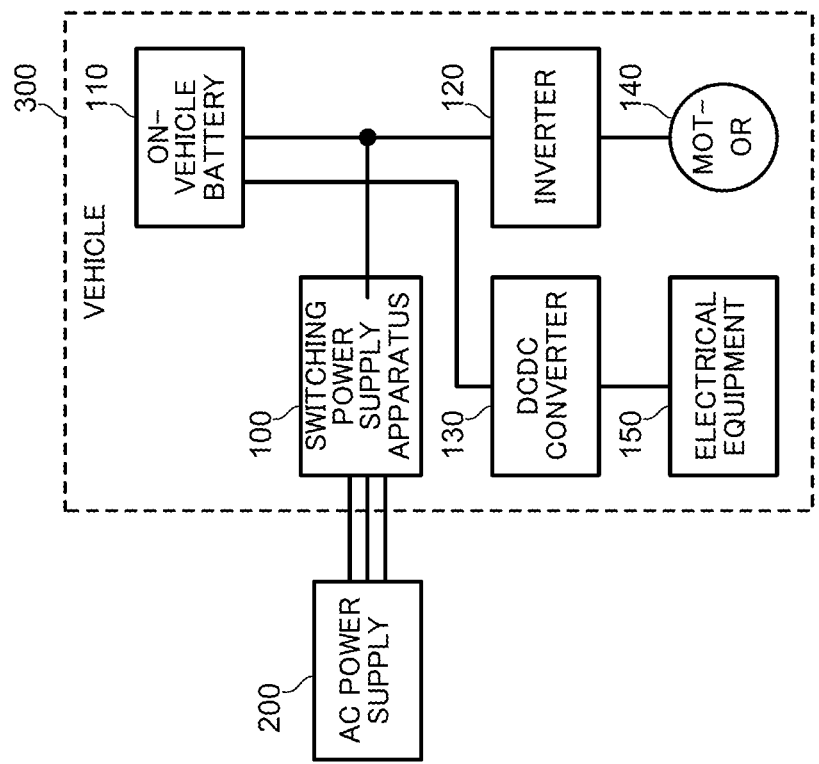
FIG. 1 illustrates a configuration of a vehicle according to an embodiment of the present disclosure.

FIG. 1 illustrates a configuration of a vehicle according to an embodiment of the present disclosure. Vehicle 300 is, for example, a passenger car, a truck, a bus, or a motorcycle. Vehicle 300 includes switching power supply apparatus 100, on-vehicle battery 110, electrical equipment 150, Direct Current to Direct Current (DCDC) converter 130, and inverter 120.

Switching power supply apparatus 100 is a power conversion apparatus that converts an AC supplied from AC power supply 200 into a DC, and supplies the DC to on-vehicle battery 110 and inverter 120, for example. The configuration of switching power supply apparatus 100 will be described later in detail. Note that switching power supply apparatus 100 may be provided in, for example, aircrafts, game equipment, and uninterruptible power conversion circuits, besides vehicle 300.

AC power supply 200 includes, for example, a power supply mounted on quick charging equipment, and a commercial power supply. Types of AC power supply 200 include a single-phase AC power supply, a two-phase AC power supply, and a three-phase AC power supply, for example. On-vehicle battery 110 is a section for storing power to drive equipment mounted on vehicle 300 such as traveling motor 140 (a main motor) and electrical equipment 150. Examples of on-vehicle battery 110 are a lithium-ion battery and a nickel-metal hydride battery. Electrical equipment 150 includes, for example, a vehicle navigation system, audio equipment, an air conditioner, power windows, a defogger, an Electronic Control Unit (ECU), a Global Positioning System (GPS) module, and an in-vehicle camera. Inverter 120 is a power conversion apparatus that converts a DC voltage into an AC voltage and supplies the AC voltage to the main motor.

Figure 2:
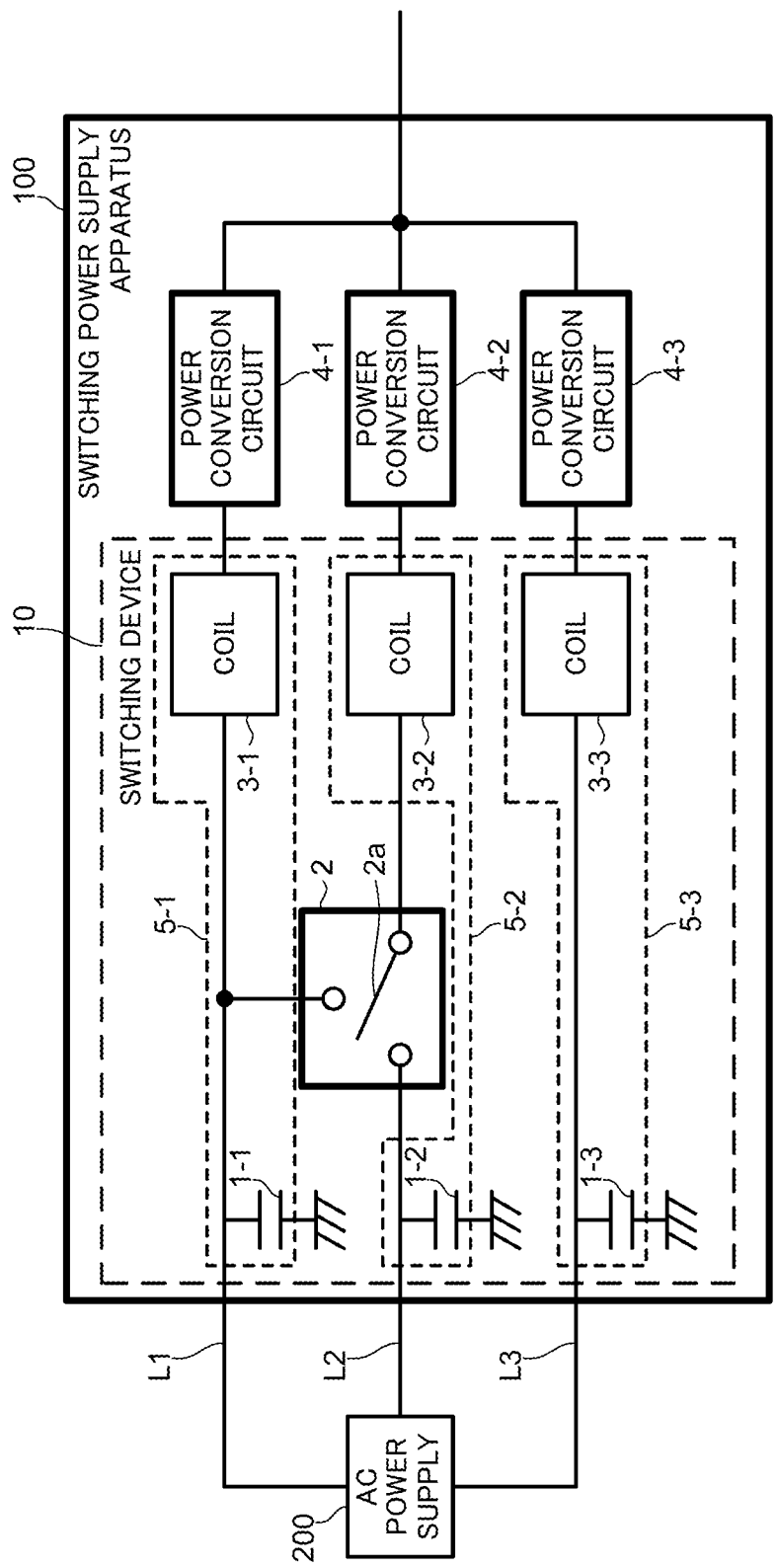
FIG. 2 illustrates an exemplary configuration of a switching power supply apparatus according to the embodiment of the present disclosure.

Next, an exemplary configuration of switching power supply apparatus 100 will be described with reference to FIG. 2. FIG. 2 illustrates the exemplary configuration of the switching power supply apparatus according to the embodiment of the present disclosure. Switching power supply apparatus 100 includes switching device 10 and a plurality of power conversion circuits 4-1, 4-2, and 4-3. Hereinafter, the plurality of power conversion circuits will be collectively referred to as "power conversion circuit 4" when the plurality of power conversion circuits 4-1, 4-2, and 4-3 are not distinguished from each other.

Switching device 10 includes a plurality of noise filters 5-1, 5-2, and 5-3, and switching circuit 2. Hereinafter, the plurality of noise filters will be collectively referred to as "noise filter 5" when the plurality of noise filters 5-1, 5-2, and 5-3 are not distinguished from each other.

Noise filter 5 is provided at a phase corresponding to each of the plurality of power conversion circuits 4-1, 4-2, and 4-3. Noise filter 5 is a noise removing section for preventing noise from entering from AC power supply 200 to power conversion circuit 4 and flowing out of power conversion circuit 4 into AC power supply 200. Noise filter 5 can prevent noise of a differential mode and a common mode. Exemplary methods of preventing the noise are to place, for example, a common mode choke coil and an X capacitor (an across-the-line capacitor) on power supply lines (power supply lines L1, L2, and L3), and/or to place a Y capacitor (a line bypass capacitor) between the power supply lines and the ground.

Noise filter 5-1 provided on power supply line L1 includes capacitor 1-1 and coil 3-1. Power supply line L1 is an electric wire through which a single-phase current flows when AC power supply 200 is a single-phase AC power supply, and a U-phase (the first phase) current, for example, flows when AC power supply 200 is a three-phase AC power supply.

Noise filter 5-2 provided on power supply line L2 includes capacitor 1-2 and coil 3-2. Power supply line L2 is an electric wire through which a single-phase current flows when AC power supply 200 is a single-phase AC power supply, and a V-phase (the second phase) current, for example, flows when AC power supply 200 is a three-phase AC power supply.

Noise filter 5-3 provided on power supply line L3 includes capacitor 1-3 and coil 3-3. Power supply line L3 is an electric wire through which a W-phase (the third phase) current, for example, flows when AC power supply 200 is a three-phase AC power supply.

Hereinafter, the capacitors will be collectively referred to as "capacitor 1" when capacitors 1-1, 1-2, and 1-3 are not distinguished from each other. Similarly, the coils will be collectively referred to as "coil 3" when coils 3-1, 3-2, and 3-3 are not distinguished from each other. Capacitor 1 includes an X capacitor and a Y capacitor, for example. Capacitor 1 is provided on the AC power supply 200 side of switching circuit 2. Coil 3 includes a common mode choke coil and a normal mode choke coil, for example. Coil 3 is provided, for example, on the power conversion circuit 4 side of switching circuit 2. Note that the location of coil 3 is not limited to the illustrated example, and may be on the AC power supply 200 side of switching circuit 2.

However, when coil 3 is provided on the AC power supply 200 side of switching circuit 2, and switching relay 2*a* of switching circuit 2 is in a mode of connecting power supply line L1 of AC power supply 200 and power conversion circuit 4-2, the required rated current for the current flowing through coil 3-1 will be twice as much as that when coil 3 is provided on the power conversion circuit 4 side of switching circuit 2. Thus, providing coil 3 on the AC power supply 200 side of switching circuit 2 increases the rating of coil 3, and iron loss and copper loss of coil 3 accelerates heat generation. The iron loss of coil 3 also increases power loss. It is thus preferable to provide coil 3 on the power conversion circuit 4 side of switching circuit 2.

Switching circuit 2 is a switching section that switches a phase of AC power supply 200 for supplying an AC current to the plurality of power conversion circuits 4 between a phase corresponding to each of the plurality of power conversion circuits 4 and a phase common to the plurality of power conversion circuits 4. Switching circuit 2 includes, for example, switching relay 2*a* and a solenoid (not illustrated) for driving switching relay 2*a*. The solenoid includes, for example, a coil that generates an electromagnetic force corresponding to a control signal outputted from a drive circuit (not illustrated), and a plunger that drives switching relay 2*a* by the electromagnetic force of the coil. The control signal is a signal indicating a connection status of switching relay 2*a*, and includes a binary rectangular wave signal having a high level or a low level, for example. The drive of the plunger according to the control signal switches the connection status of switching relay 2*a*. Switching relay 2*a* switches between a status of connecting to power supply line L1 and a status of connecting to power supply line L2 by the control signal. Note that switching circuit 2 is not limited to the solenoid switching circuit, and may be composed of a semiconductor switching element.

Power conversion circuit 4 includes, for example, an Alternating Current to Direct Current (ACDC) converter that converts an AC voltage into a DC voltage, and a DCDC converter that converts the DC voltage into a voltage of a predetermined value. Note that power conversion circuit 4 is not limited to be provided with both an ACDC converter and a DCDC converter, and may be provided with only an ACDC converter.

Figure 3:
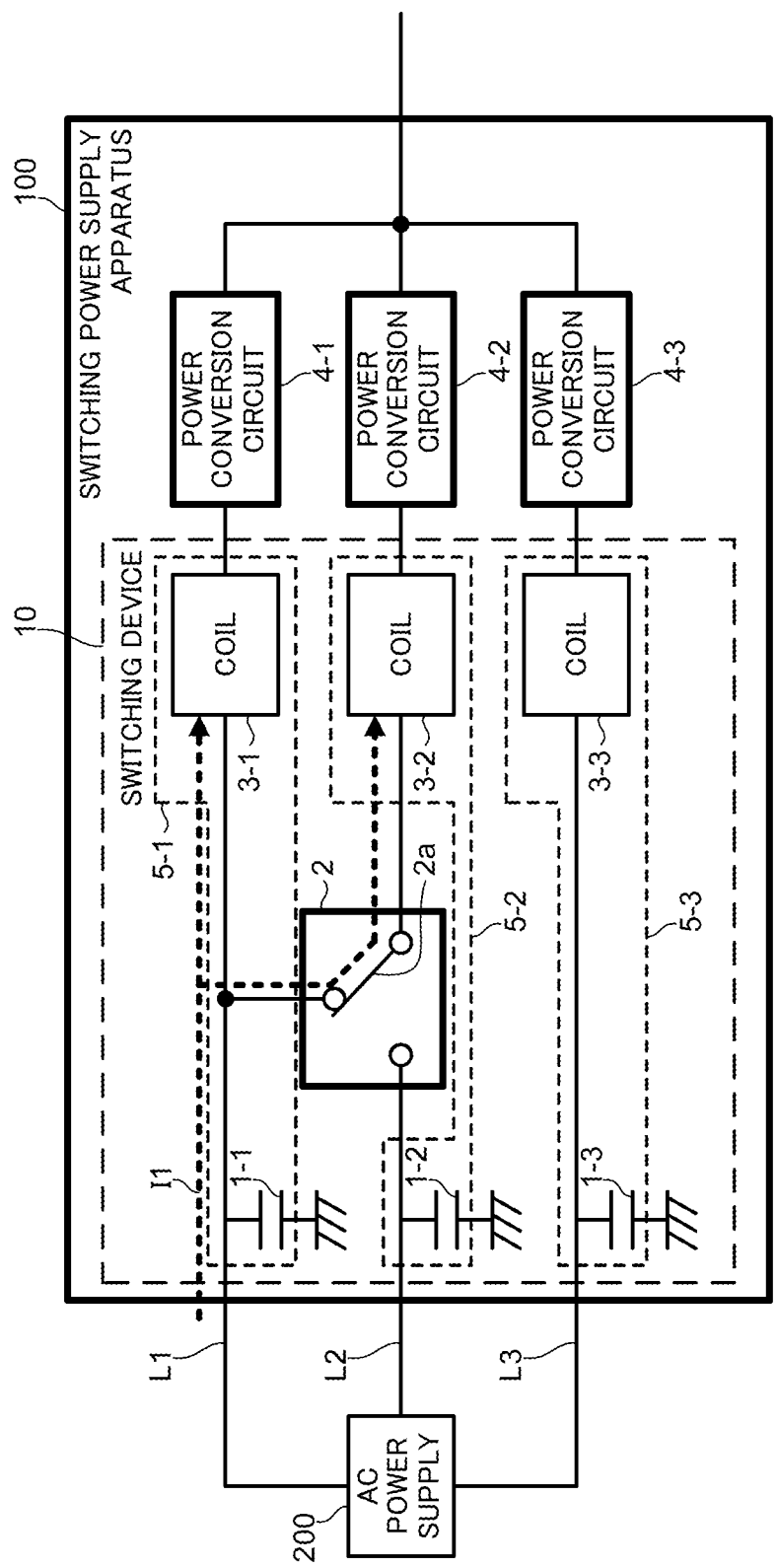
FIG. 3 is a diagram for describing an operation of the switching power supply apparatus.
Figure 4:
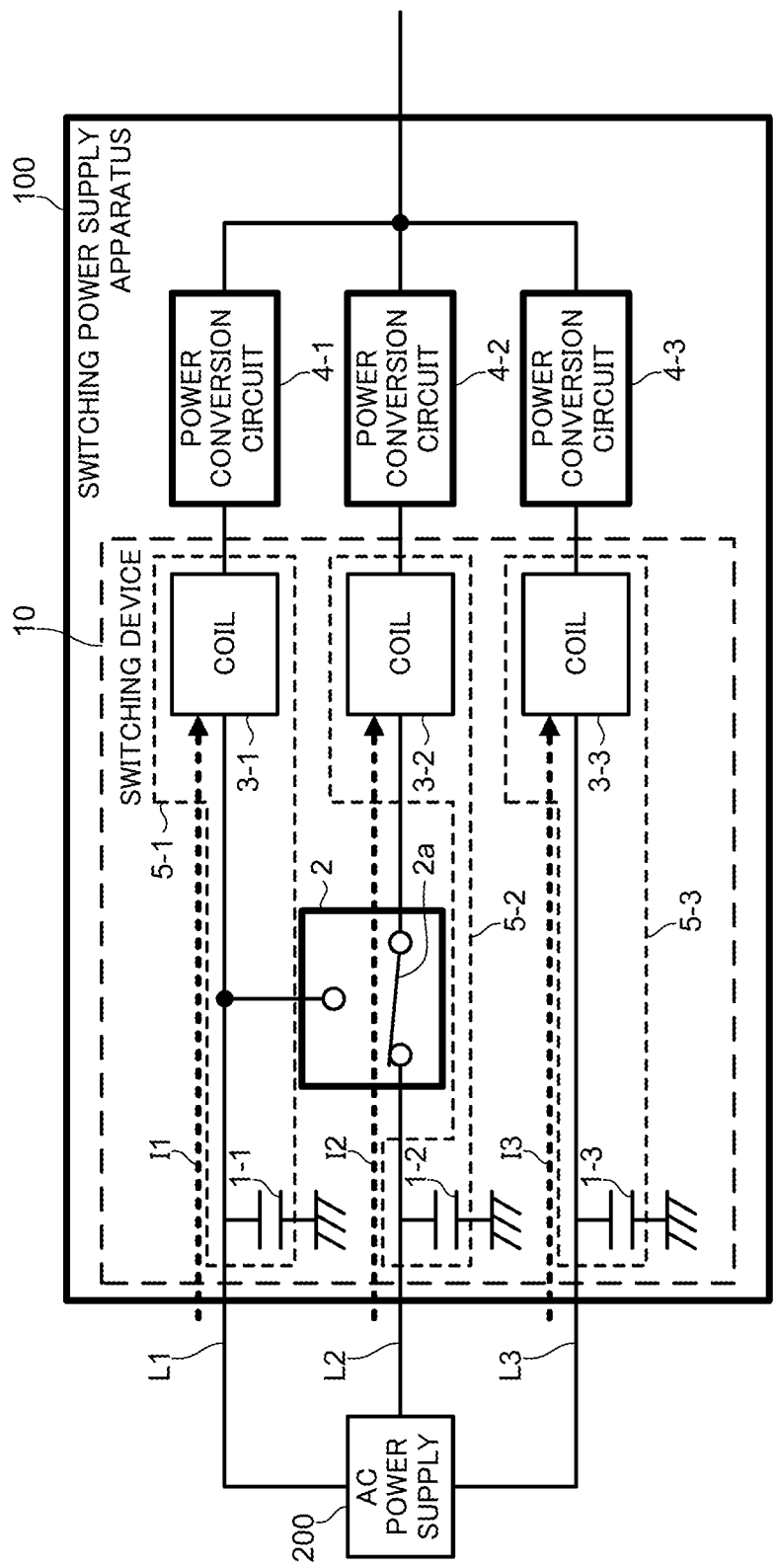
FIG. 4 is a diagram for describing another operation of the switching power supply apparatus.

Next, the operation of switching power supply apparatus 100 will be described with reference to FIGS. 3 and 4. FIGS. 3 and 4 are diagrams for describing the operation of the switching power supply apparatus. When AC power supply 200 is a single-phase AC power supply, and switching relay 2*a* is in contact with power supply line L1 as illustrated in FIG. 3, the single-phase AC current flowing through power supply line L1 (current I1) is distributed to coils 3-1 and 3-2 by switching circuit 2, and supplied to power conversion circuits 4-1 and 4-2. This enables to utilize a plurality of power conversion circuits 4 with a small rated capacity even when AC power supply 200 is a single-phase AC power supply, thereby increasing the rated capacity of the entire switching power supply apparatus 100.

Meanwhile, when AC power supply 200 is a three-phase AC power supply, and switching relay 2*a* is in contact with power supply line L2 as illustrated in FIG. 4, the first phase AC current flowing through power supply line L1 (current I1), the second phase AC current flowing through power supply line L2 (current I2), and the third phase AC current flowing through power supply line L3 (current I3), are respectively supplied to power conversion circuits 4-1, 4-2 and 4-3. This enables to utilize three power conversion circuits 4 and further increase the rated capacity of the entire switching power supply apparatus 100.

Figure 5:
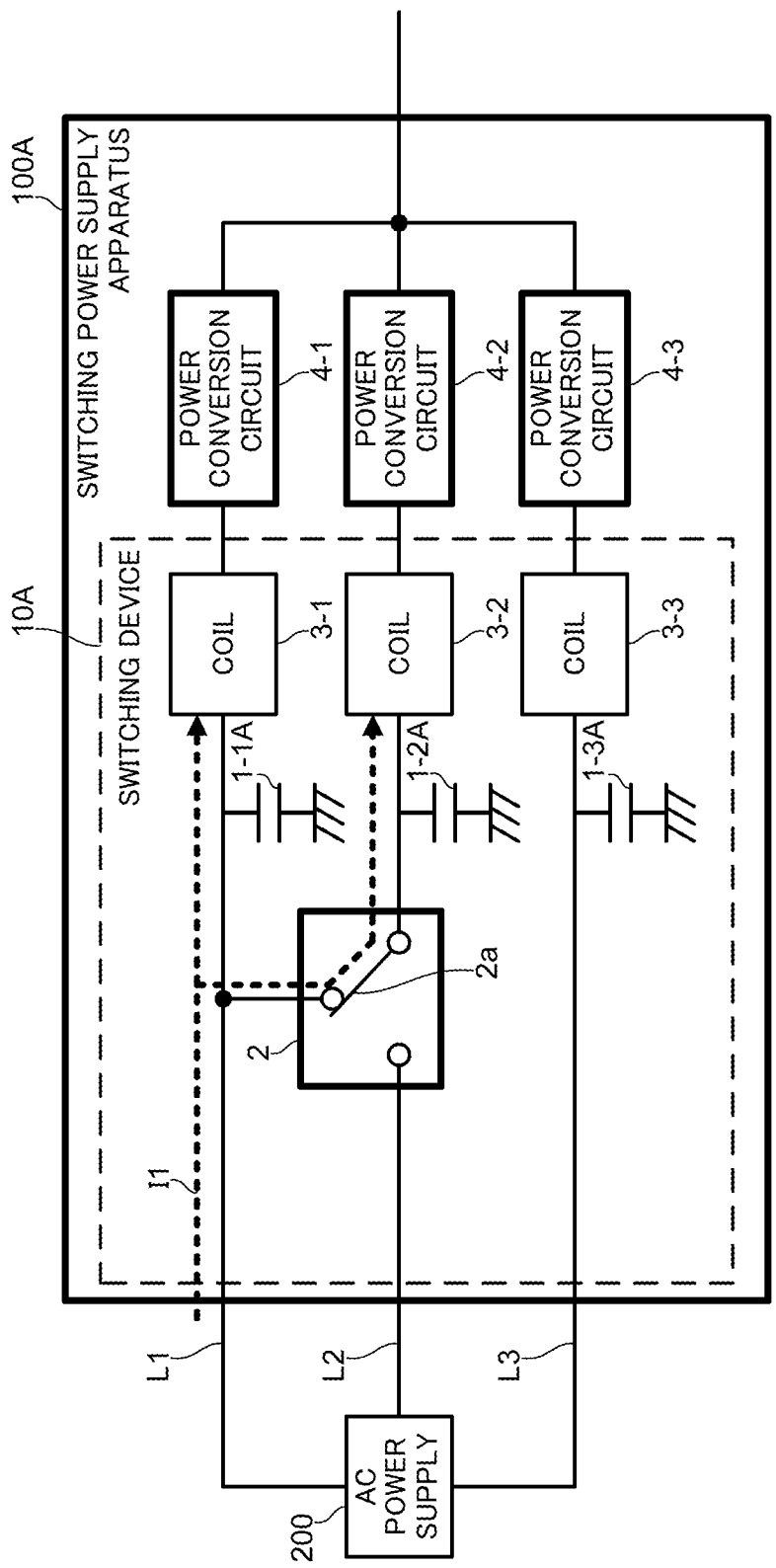
FIG. 5 illustrates a comparative example of the switching power supply apparatus according to the embodiment of the present disclosure.

Next, comparative examples of switching power supply apparatus 100 will be described with reference to FIGS. 5 to 7. FIG. 5 illustrates a comparative example of the switching power supply apparatus according to the embodiment of the present disclosure. Note that the same components as those in FIG. 2 are denoted by the same reference signs in FIG. 5, and descriptions thereof are omitted.

Switching power supply apparatus 100A illustrated in FIG. 5 includes switching device 10A in place of switching device 10. Switching device 10A includes a plurality of capacitors 1-1A, 1-2A, and 1-3A provided between switching circuit 2 and power conversion circuit 4, in place of a plurality of capacitors 1-1, 1-2, and 1-3.

Figure 6:
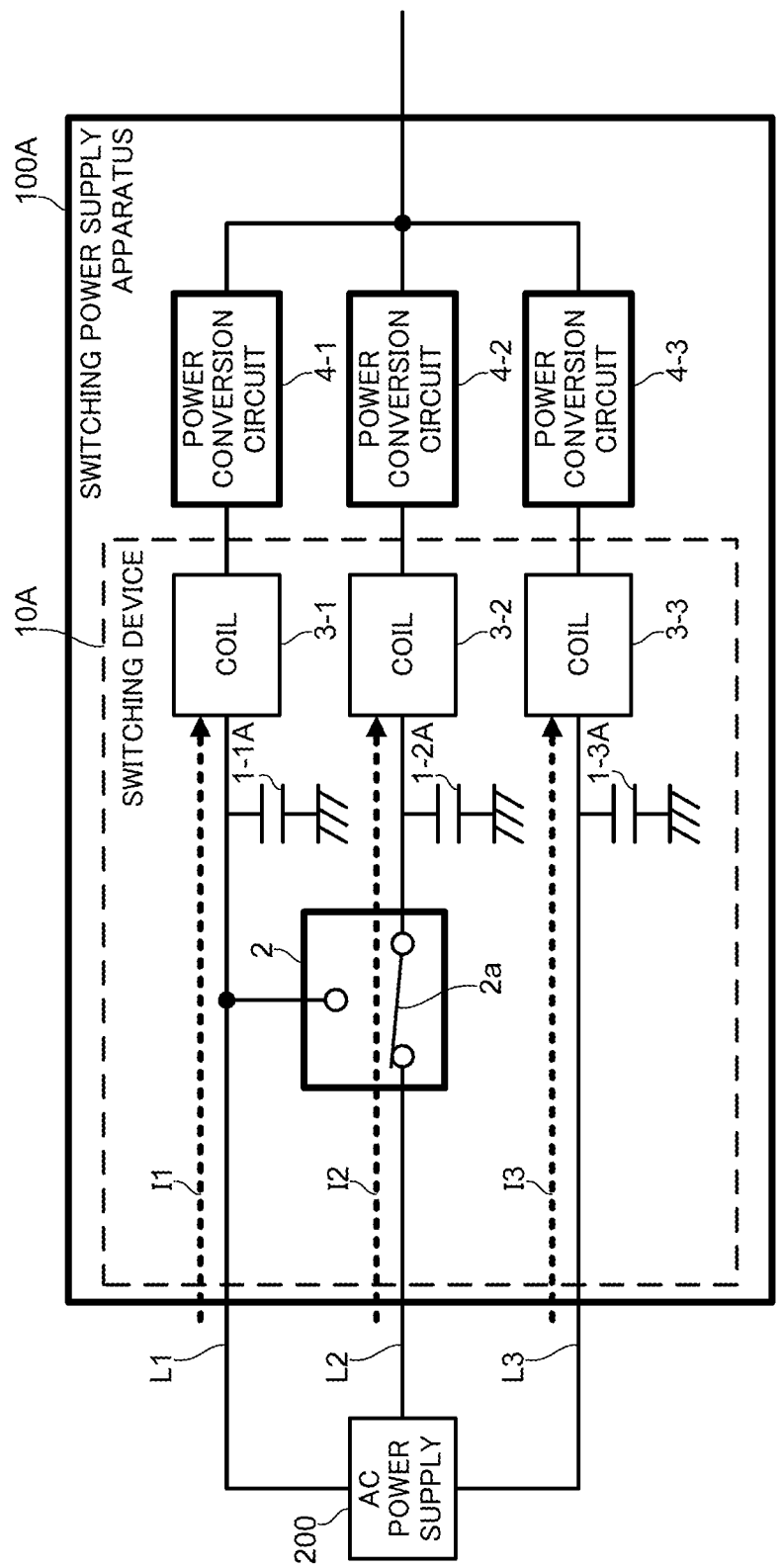
FIG. 6 is a diagram for describing an operation of the switching power supply apparatus in FIG. 5.
Figure 7:
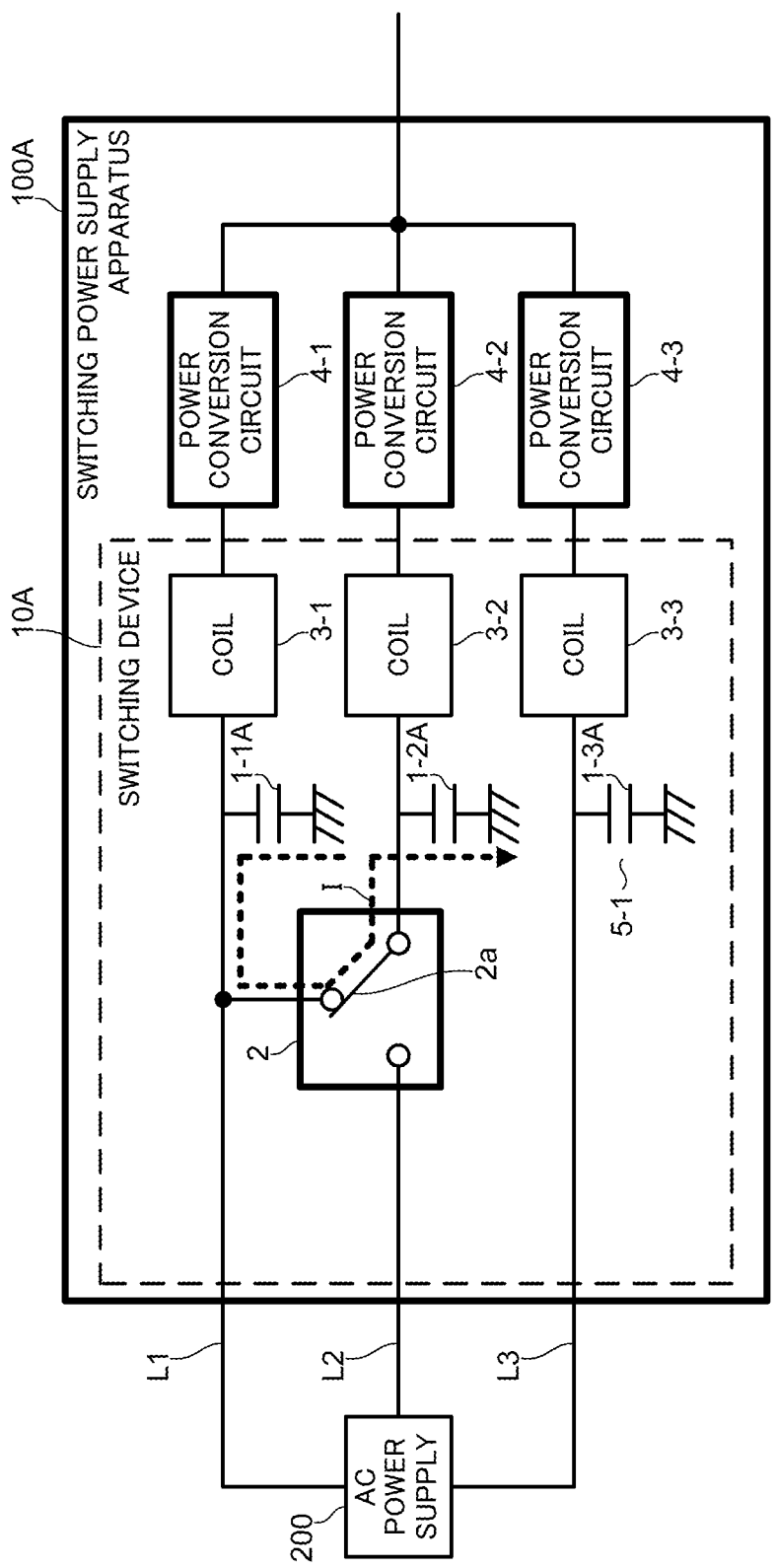
FIG. 7 is a diagram for describing another operation of the switching power supply apparatus in FIG. 5.

FIGS. 6 and 7 are diagrams for describing the operation of the switching power supply apparatus illustrated in FIG. 5. When switching relay 2a is initially connected to power supply line L2, and single-phase power is supplied from AC power supply 200, switching relay 2a switches the connection from the status of connecting to power supply line L2 to the status of connecting to power supply line L1. When the connection of switching relay 2a is switched to power supply line L1 as describe above, in a state where AC power is supplied only to power supply line L1 as illustrated in FIG. 7, charges stored in capacitor 1-1A is discharged, and it causes overcurrent I indicated by a broken line. Overcurrent I flows to the ground through, for example, switching circuit 2 and capacitor 1-2A for the following reason. Components such as coil 3-1 and power conversion circuit 4-1 are provided on the power conversion circuit 4-1 side of switching circuit 2 on power supply line L1, and this causes a resistance value of the path formed by switching circuit 2 and capacitor 1-2A to be lower than a resistance value of the coil 3-1 side of capacitor 1-1A.

When overcurrent I flows in switching relay 2a of switching circuit 2 as described above, the contact of switching relay 2a is overheated and possibly melted or worn out. Further, overcurrent I flown through capacitor 1-2A heats capacitor 1-2A. This causes the capacitance reduction or the increase of internal resistance of capacitor 1-2A, thereby shortening the life of capacitor 1-2A.

In contrast, switching power supply apparatus 100 according to the present embodiment includes capacitor 1 provided on the AC power supply 200 side of switching circuit 2. This configuration makes the resistance value of the switching circuit 2 side of capacitor 1-1 higher than that of the AC power supply 200 side of capacitor 1-1. Thus, the above-described overcurrent I hardly flows into switching circuit 2 even when switching relay 2a is switched to the ON status while the AC current is supplied to power conversion circuit 4. This prevents, as a result, the wear of switching relay 2a and the deterioration of capacitor 1, for example, caused by overcurrent I.

Note that switching power supply apparatus 100 may be configured as follows. A variation of switching power supply apparatus 100 will be described with reference to FIG. 8. Note that the same components as those in FIG. 2 are denoted by the same reference signs in FIG. 8, and descriptions thereof are omitted.

Figure 8:
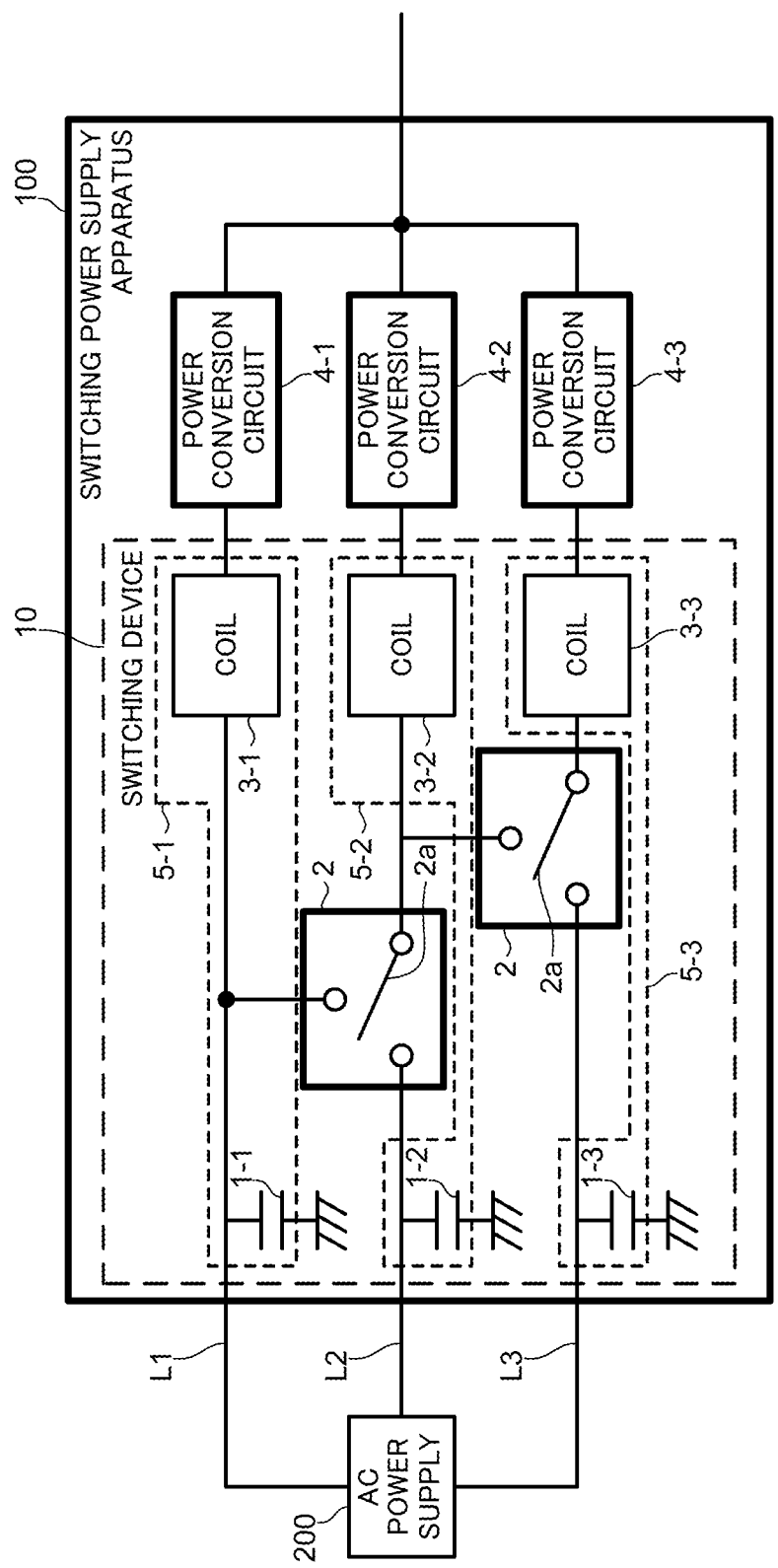
FIG. 8 illustrates a variation of the switching power supply apparatus according to the embodiment of the present disclosure.

FIG. 8 illustrates the variation of the switching power supply apparatus according to the embodiment of the present disclosure. Switching power supply apparatus 100 illustrated in FIG. 8 further includes switching circuit 2 between power supply lines L2 and L3. This configuration makes it possible to supply the AC current supplied from a single-phase power supply to each of the three power conversion circuits 4, thereby increasing the rated capacity of switching power supply apparatus 100 utilizing those three power conversion circuits 4 with a small rated capacity.

Note that a plurality of capacitors 1 and coils 3 may be provided for a single power supply line, although the present embodiment has described a configuration example of providing a single capacitor 1 and a single coil 3 for a single power supply line. For example, one or more sets of capacitor 1 and coil 3 may be provided both on the AC power supply 200 side and the power conversion circuit 4 side of switching circuit 2. This further prevents noise from entering and flowing out. Note that coil 3 in the set of coil 3 and capacitor 1 provided on the power conversion circuit 4 side of switching circuit 2 is provided next to switching circuit 2 in order to prevent the occurrence of overcurrent I described above.

Further, when a plurality of sets of capacitor 1 and coil 3 are provided for a single power supply line, all of the plurality of coils 3 are preferably provided on the power conversion circuit 4 side of switching circuit 2. This configuration enables to prevent power loss by coil 3 compared with the case of providing coil 3 on the AC power supply 200 side of switching circuit 2. Providing switching device 10 with such a configuration makes switching power supply apparatus 100 robust against noise while enhancing the power conversion efficiency.

A power conversion circuit of the present disclosure includes a converter that converts an AC voltage supplied from a multiple-phase power supply into a DC voltage.

The power conversion circuit of the present disclosure includes a converter that converts the DC voltage into a voltage of a predetermined value.

A switching circuit of the present disclosure is a solenoid switching circuit.

The switching circuit of the present disclosure is a semiconductor switching element.

An external power supply of the present disclosure is a single-phase AC power supply.

The external power supply of the present disclosure is a two-phase AC power supply.

The external power supply of the present disclosure is a three-phase AC power supply.

The external power supply of the present disclosure is a power supply mounted on quick charging equipment.

An uninterruptible power conversion circuit of the present disclosure includes the switching power supply apparatus described above.

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-042054, filed on Mar.

11, 2020, the disclosure of which including the specification, drawings and abstract is incorporated herein by reference in its entirety.

Although specific examples of the present disclosure have been described in detail above, these are merely illustrative and do not limit the scope of the claims. The art described in the claims includes various modifications and variations of the specific examples illustrated above.

INDUSTRIAL APPLICABILITY

An embodiment of the present disclosure is suitable for a parking assistance apparatus and a parking assistance system.

The invention claimed is:

1. A switching device configured to be connected to an external power supply, and provided with a plurality of power conversion circuits, the switching device comprising:
   a switching circuit configured to switch a connection of a first power conversion circuit of the plurality of power conversion circuits,
      the external power supply being a power supply selected from a multiple-phase power supply and a single-phase power supply,
      the plurality of power conversion circuits respectively corresponds to phases of the multiple-phase power supply,
      in a case where the external power supply is the multiple-phase power supply, the switching circuit connects the first power conversion circuit to a first phase of the external power supply corresponding to the first power conversion circuit,
      in a case where the external power supply is the single-phase power supply, the switching circuit connects the first power conversion circuit to a second phase of the external power supply corresponding to a second power conversion circuit of the plurality of power conversion circuits; and
   a noise filter that includes a capacitor and a coil configured to remove noise, the switching circuit being connected between the capacitor and the coil.

2. The switching device according to claim 1, wherein the capacitor is provided on a side of the external power supply of the switching circuit, and the coil is provided on a side of the plurality of power conversion circuits of the switching circuit.

3. The switching device according to claim 1, wherein the noise filter includes a plurality of the capacitors and a plurality of the coils, and
   at least one of the plurality of capacitors is provided on a side of the multiple-phase power supply of the switching circuit.

4. The switching device according to claim 3, wherein all of the plurality of coils are provided on a side of the plurality of power conversion circuits of the switching circuit.

5. The switching device according to claim 3, wherein all of the plurality of capacitors are provided on the side of the multiple-phase power supply of the switching circuit.

6. The switching device according to claim 1, wherein the coil is a common mode choke coil or a normal mode choke coil.

7. The switching device according to claim 1, wherein the capacitor is an across-the-line capacitor or a line bypass capacitor.

8. The switching device according to claim 1, wherein each of the plurality of power conversion circuits includes a converter configured to convert an alternating current (AC) voltage supplied from the external power supply into a direct current (DC) voltage.

9. The switching device according to claim 8, wherein each of the plurality of power conversion circuits includes a converter configured to convert the DC voltage into a voltage of a predetermined value.

10. The switching device according to claim 1, wherein the switching circuit is a solenoid switching circuit.

11. The switching device according to claim 1, wherein the switching circuit is a semiconductor switching element.

12. The switching device according to claim 1, wherein the singe-phase power supply is a single-phase alternating current (AC) power supply.

13. The switching device according to claim 1, wherein the multiple-phase power supply is a two-phase alternating current (AC) power supply.

14. The switching device according to claim 1, wherein the multiple-phase power supply is a three-phase alternating current (AC) power supply.

15. The switching device according to claim 1, wherein the external power supply is a power supply mounted on quick charging equipment.

16. A switching power supply apparatus, comprising:
   the switching device according to claim 1; and
   the plurality of power conversion circuits.

17. A vehicle, comprising the switching power supply apparatus according to claim 16.

* * * * *